United States Patent
Moroney et al.

(10) Patent No.: US 8,462,954 B2
(45) Date of Patent: Jun. 11, 2013

(54) CONTENT ENCRYPTION USING AT LEAST ONE CONTENT PRE-KEY

(75) Inventors: Paul Moroney, Olivenhain, CA (US); Petr Peterka, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 895 days.

(21) Appl. No.: 12/474,259

(22) Filed: May 28, 2009

(65) Prior Publication Data

US 2009/0296940 A1    Dec. 3, 2009

Related U.S. Application Data

(60) Provisional application No. 61/057,583, filed on May 30, 2008.

(51) Int. Cl.
    *H04L 9/08*          (2006.01)

(52) U.S. Cl.
    USPC ............................ 380/278; 380/44; 713/189

(58) Field of Classification Search
    USPC .................................... 380/278, 44; 713/189
    See application file for complete search history.

(56) References Cited

U.S. PATENT DOCUMENTS

| | | |
|---|---|---|
| 7,231,663 B2 | 6/2007 | Medvinsky |
| 7,237,108 B2 | 6/2007 | Medvinsky et al. |
| 7,243,366 B2 | 7/2007 | Medvinsky et al. |
| 7,251,328 B2 | 7/2007 | Diamand et al. |
| 7,353,388 B1 * | 4/2008 | Gilman et al. ................. 713/168 |
| 7,404,082 B2 | 7/2008 | Medvinsky et al. |
| 2003/0134615 A1* | 7/2003 | Takeuchi ....................... 455/411 |
| 2005/0022019 A1 | 1/2005 | Medvinsky et al. |
| 2005/0071663 A1 | 3/2005 | Medvinsky et al. |
| 2005/0071669 A1 | 3/2005 | Medvinsky et al. |
| 2005/0125357 A1* | 6/2005 | Saadat et al. .................... 705/57 |
| 2006/0242069 A1 | 10/2006 | Peterka et al. |
| 2007/0179898 A1 | 8/2007 | Medvinsky et al. |
| 2007/0185815 A1 | 8/2007 | Boccon-Gibod et al. |
| 2008/0015997 A1* | 1/2008 | Moroney et al. ................. 705/51 |
| 2008/0097919 A1* | 4/2008 | Szucs .............................. 705/52 |
| 2008/0250508 A1 | 10/2008 | Montague et al. |
| 2008/0270307 A1 | 10/2008 | Olson et al. |

OTHER PUBLICATIONS

"Overview of Motorola IP Rights Management (IPRM) System: Content Protection for Home Networks (IPRM-HN)", Version 1.1, Apr. 10, 2009.

PCT Search Report and Written Opinion, Re: Application #PCT/US09/45592 Jul. 6, 2009.

* cited by examiner

*Primary Examiner* — Carl Colin
*Assistant Examiner* — Mohammad A Siddiqi

(57) ABSTRACT

In a method for encrypting content, the content is received in a device and at least a portion of the content is stored to thereby associate the content with one of a first copy control state and a second copy control state. The method includes creating at least one of a first content pre-key using a local storage key unique to the device as a key to encrypt the content ID of the content and a second content pre-key using the first content pre-key as a key to encrypt the first copy control state, creating a content encryption key using one of the first content pre-key as a key to encrypt the first copy control state and the second content pre-key as a key to encrypt the second copy control state, and encrypting the content using the content encryption key.

17 Claims, 7 Drawing Sheets

US 8,462,954 B2

CONTENT ENCRYPTION USING AT LEAST ONE CONTENT PRE-KEY

CLAIM OF PRIORITY

The present application claims the benefit of priority to U.S. Provisional Patent Application Ser. No. 61/057,583, filed on May 30, 2008, entitled "Key Generation Approach for PVR", the disclosure of which is hereby incorporated by reference in its entirety.

RELATED APPLICATIONS

The present application also shares some common features with commonly assigned and copending U.S. patent application Ser. No. 11/321,210 (2006/0242069), filed on Dec. 29, 2005, entitled "Digital Rights Management for Local Recording and Home Network Distribution", commonly assigned and copending U.S. patent application Ser. No. 10/933,011 (2005/0071669), filed on Sep. 2, 2004, entitled "Separation of Copy Protection Rules", commonly assigned and copending U.S. patent application Ser. No. 12/108,719 (2008/0267398), entitled "Method and Apparatus for Assisting with Content Key Changes", filed on Apr. 24, 2008, and commonly assigned U.S. Pat. No. 7,243,366, filed on Mar. 4, 2002, entitled "Key Management Protocol and Authentication System for Secure Internet Protocol Rights Management Architecture", the disclosures of which are hereby incorporated by reference in their entireties.

BACKGROUND

Many conventional systems and methods exist for transferring digital information from content providers to various end user communication devices. Digital information includes video content, such as movies and programming events, music, and other digital information suitable for transfer from one or more content providers. End user communication devices include set-top boxes and residential gateways, and mobile communication devices, such as personal digital assistants (PDAs), personal computers and smart phones. Typically, systems and methods for transferring digital information to various end user communication devices involve some sort of digital rights management (DRM) format or scheme that usually includes encrypting the content to be transferred and providing one or more decryption keys to authorized users of user devices for decrypting the encrypted content.

In addition, the digital nature of current media presents significant challenges with respect to protection of rights of such content. In particular, current home media hubs and personal or local networks have difficulty protecting high-value content against, for instance, unauthorized copying within the network. These problems are compounded when content is distributed within a personal network, and stem from a lack of capabilities of maintaining and enforcing copy protection and DRM rules, as well as from the translation from incoming and outgoing copy protection and DRM rules to those of the personal network.

For instance, a copy protection rule may indicate a value of "Copy Once", which requires the recorded content to be treated as "Copy No More", preventing further copies to be made. If the user wants to make a permanent recording, the content will be marked as "Copy No More" and all outputs will be set accordingly during playback. On the other hand, if the recording is only temporary, such as a pause buffer, and will be deleted soon after the show/program is over, the content must be treated still as "Copy Once" and all outputs must signal the copy protection as "Copy Once". The user's intention with the content is not always known at the outset of a recording. Thus, it is possible that the user may change the user's mind during the recording, thereby changing what started as a temporary pause buffer recording into a permanent recording. Such a change may not be possible in certain instances because the content may already have been marked as "Copy No More" during copying into the temporary pause buffer.

SUMMARY

Disclosed herein is a method for encrypting content that is performed by a computing apparatus. The computing apparatus may comprise circuit components and/or a processor for implementing or executing computer-readable instructions. In the method, the content is received in a device, in which the content is associated with a unique content identification (ID) and copy control bits. At least a portion of the content is stored, thereby associating the content with one of a first copy control state and a second copy control state, depending on usage. The method also includes steps of: creating at least one of a second content pre-key using the first content pre-key as a key to encrypt the first copy control state and a third content key using the second content pre-key as a key to encrypt the second copy control state; and encrypting the content using one of the second content pre-key and the third content key.

Also disclosed is a device configured to enforce digital rights management rules for content. The device includes a tuner for receiving the content, which is associated with a content identification (ID) and copy control bits. The device also includes storage means for storing at least a portion of the content, thereby associating the content with one of a first copy control state and a second copy control state, depending on usage. The device further includes an encryption module configured to create a first content pre-key using a local storage key unique to the device as a key to encrypt the content ID of the content. The device is also configured to create at least one of a second content pre-key using the first content pre-key as a key to encrypt the first copy control state and a third content key using the second content pre-key as a key to encrypt the second copy control state, and to encrypt the content using one of the second content pre-key and the third content key.

Further disclosed is a computer readable storage medium on which is embedded one or more computer programs, the one or more computer programs implementing a method for encrypting content. The one or more computer programs include a set of instructions for: receiving the content in a device, said content being associated with a unique content identification (ID) and copy control bits, storing at least a portion of the content, thereby associating the content with one of a first copy control state and a second copy control state, depending on the usage; creating a first content pre-key using a local storage key unique to the device as a key to encrypt the content ID of the content; creating at least one of a second content pre-key using the first content pre-key as a key to encrypt the first copy control state and a third content key using the second content pre-key as a key to encrypt the second copy control state; and encrypting the content using one of the second content pre-key and the third content key.

Through implementation of the method and device disclosed herein, both the copy protection data and the user's potential change of intent during a recording process are taken in to account during a key derivation process.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

The systems disclosed herein provide a complete standards-based end-to-end scalable DRM system for storage, delivery and in-home distribution of digital content over IP networks using standard protocols such as Real-time Transport Protocol ("RTP"), Hypertext Transfer Protocol ("HTTP"), or IP-encapsulated MPEG-2 Transport Stream, or traditional MPEG-2 networks. The systems are employed to protect digital content and to enforce DRM and copy protection rules for content added to the network and for content once within the network. A typical use for such systems would be an in-home media hub where protected content is recorded and distributed.

The systems disclosed herein may be used in at least the following types of models: stand-alone environments to protect content stored on a digital video recorder (DVR) or personal video recorder (PVR); networking environments to secure distributed content within the user domain, i.e., a home or business network; and end-to-end content distribution systems which protect content at the service provider site and during its distribution to the end user.

The Internet Protocol Rights Management ("IPRM") system disclosed herein allows content owners and service providers to deliver content in a secure manner so that the content owner's rights are protected, and business models and contracts enforced, while simultaneously providing end-users, such as consumers, with seamless and easy-to-use content consumption controls. IPRM provides a mechanism for receiving content from one security domain, re-encrypting that content uniquely for a receiving device, persistently storing that content, and playing back that content at a later time to and within another security domain. IPRM also provides the ability to stream the persistently-stored content from the initial receiving device to another device that has been authenticated as part of the home network. This allows a media server, e.g., a dual-tuner set-top box ("STB") with hard drive, to deliver recorded content to any TV in the house by streaming to media clients such as STBs. Of course, it is noted that while a home network is described, extensions to a business or other such local network are analogous.

Figure 1:
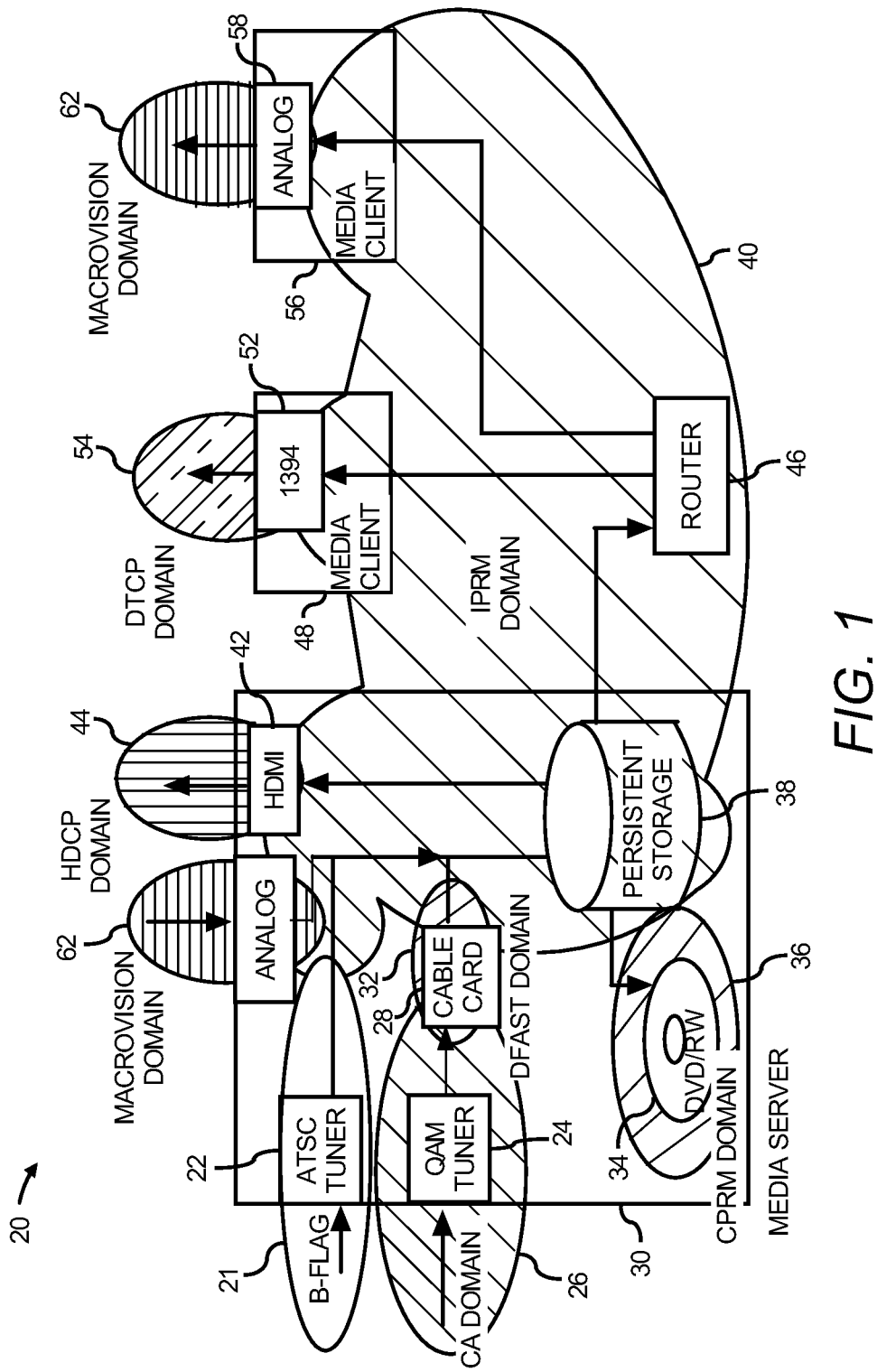
FIG. 1 illustrates a digital rights management system employing multiple input and display devices and a source of persistent storage, according to an embodiment of the invention.

With reference first to FIG. 1, there is shown an Internet Protocol Rights Management ("IPRM") system 20 employing multiple inputs, display devices, and a device, such as, a digital video recorder ("DVR") or media server 30, according to an embodiment. It should be understood that the following description of the IPRM system 20 is but one manner of a variety of different manners in which such an IPRM system 20 may be configured and operated. In addition, it should be understood that the IPRM system 20 may include additional components and that some of the components described may be removed and/or modified without departing from a scope of the IPRM system 20.

Specifically, FIG. 1 shows an IPRM system 20 employed in the home network for the purposes of receiving, recording, playing back, and streaming, copying or moving audio-video multimedia content in the home network. In this case, IPRM provides the DRM system that translates and enforces copy protection and digital rights management rules that are received from the input stream and applied on the output stream. The DVR 30 includes a source of persistent storage 38, such as a hard drive, flash memory, etc., or a combination of types of devices.

The content on DVR 30 may be protected and associated with content access rights. The content access rights that apply to the content stored on a persistent storage device, such as DVR 30, also apply to the other devices in the secure IPRM domain. In addition, there may be devices in the IPRM system that lack persistent storage, i.e., that do not persistently save the encrypted content or any of the associated information, e.g., keys, persistence rules and metadata. These devices may still have additional digital or analog output ports that must be enabled or disabled, depending on the copy protection rules associated with the content.

Various inputs lead into the DVR 30. The following inputs are shown: an ATSC tuner 22 which receives signals corresponding to digital television, broadband, etc., which signals, within domain 21, are protected by, e.g., a broadcast flag (or ATSC Redistribution Control Descriptor) technique; a QAM tuner 24 for signals within domain 26 which are protected by, e.g., a Conditional Access ("CA") technique, these signals being transmitted to a digital interface such as CableCard 28 that handles signals in domain 32 protected by, e.g., a Dynamic Feedback Arrangement Scrambling Technique ("DFAST"); a DVD/RW source 34 to service signals in domain 36 protected by, e.g., a Content Protection for Recordable Media ("CPRM") or DVD Content Scrambling System (CSS) technique. DVD source 34 both receives and provides content. Other inputs may include digital signals in domain 36, which are, e.g., protected by other proprietary systems. At each input domain boundary, rules information, e.g., CCI, APS, CIT, CGMS-A, may be imported and securely linked with the received media.

Outputs from the DVR 30 include a High Definition Multimedia Interface ("HDMI") 42 protected by a High-Definition Digital Content Protection ("HDCP") domain 44. A router 46 is employed to route signals to other devices in the home network, including, e.g., a media client 48 with a Firewire or IEEE-1394 interface 52 protected by a Digital Transmission Content Protection ("DTCP") domain 54. Another output is a media client 56 with an analog interface 58 protected by Macrovision or CGMS-A in an analog domain 62. The media server 30 with its outputs and an optional router 46 and client devices 48 and 56 are collectively referred to here as operating within a secure IPRM domain 40. The persistent storage 38 may also output to an optical or other drive, such as DVD/RW drive 34.

Various options exist to share content with the IPRM system 20. These include: streaming content from the gateway to another device, copying content from a storage device to another storage device, and moving content from a storage device to another storage device. In general, there are two main scenarios that are applicable for local content protection: secure recording of content and secure playback of content. The detailed steps of these scenarios are described below with respect to FIGS. 2-5.

Figure 2:
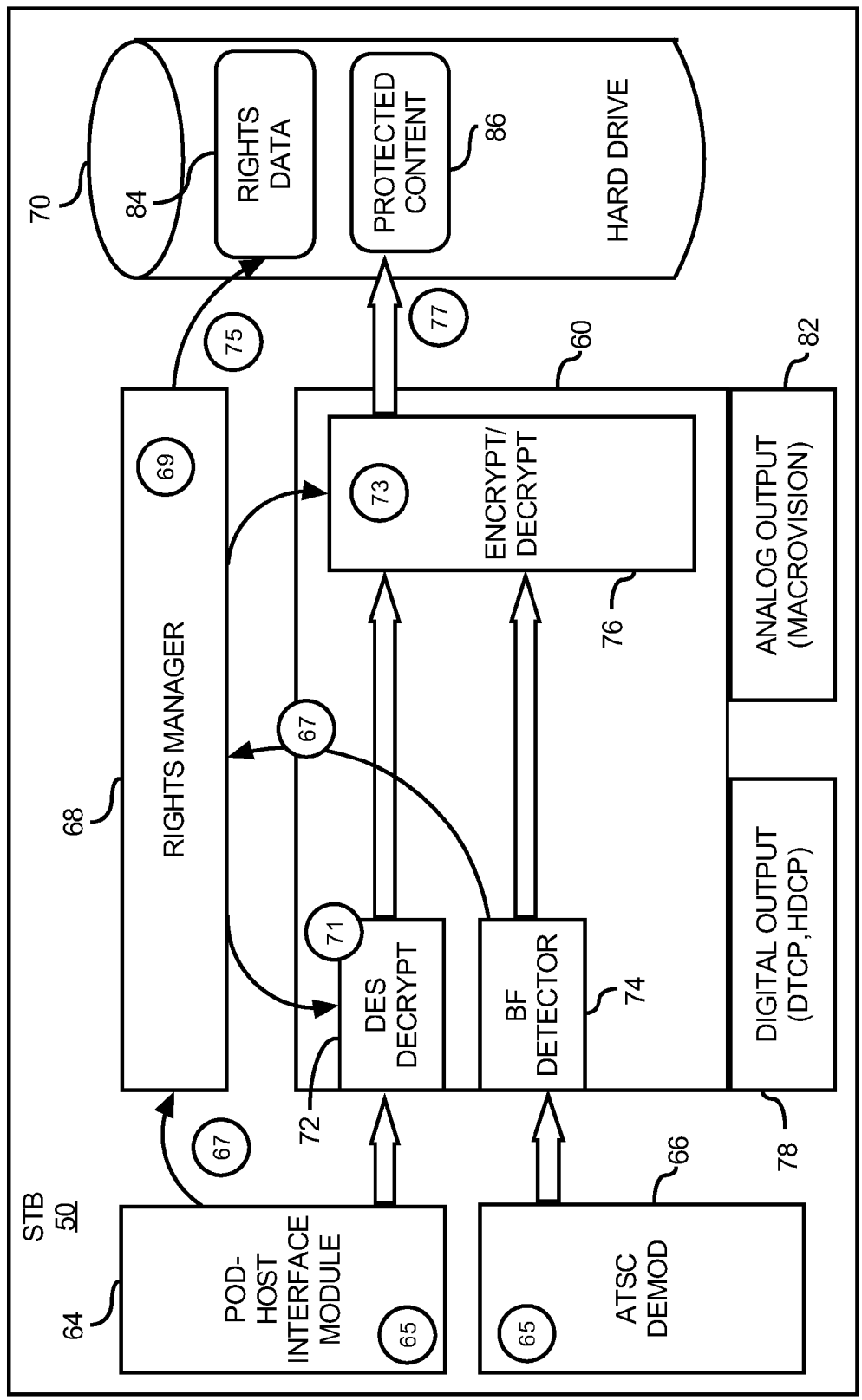
FIG. 2 depicts an example of a system illustrating a method of content recording, according to an embodiment of the invention.

For content recording, and referring to FIG. 2, a set-top box ("STB") 50 is shown in which several modules 64 and 66 are shown for receiving and interfacing with outside signals. Other sources of content may be used, such as IEEE1394/DTCP, analog signal with CGMS-A or Macrovision, protected IP input, DVD/CSS, etc. The STB 50 further includes a rights manager 68 to control distribution of and access to protected content. Hard drive 70 stores content 86 and rights data 84. A module 60 may include decryptor 72 and broadcast flag detector 74 for decryption or other control of content from modules 64 and 66. An encryption/decryption module 76 allows the subsequent re-encryption of protected content or keys such that the same is substantially never available in an un-encrypted form. One or more of the modules 64, 66, and 76 contained in the STB 50 may form part of a computing apparatus, which may include one or more circuit components for performing the functions of the modules 64, 66, and 76 disclosed herein. In addition, or alternatively, one or more of the modules 64, 66, and 76 may comprise software that is executable by a processor of a computing apparatus.

The content is received into the STB 50 from any of the external sources described above, e.g., such as a CableCard 28, CA smartcard, an analog signal, an ATSC signal, a signal from an IEEE-1394 source (not shown), and the like (step 65). In FIG. 2, this signal is shown as being processed by, e.g., ATSC demodulator 66 or a point-of-deployment ("POD") host interface (CableCard) module 64. Content from POD module 64 may be decrypted by, e.g., decrypt module 72 which employs the data encryption standard ("DES" or "3DES") or Advanced Encryption Standard ("AES"). Content from ATSC demodulator 66 may be passed through Broadcast flag ("BF") detector 74.

This content may be protected. If it is protected, or otherwise employs access rights, rights data is requested from the rights manager 68 (step 67). The rights data may include content rights and restrictions translated from Copy Control Information ("CCI"), EMI information, APS, CIT, SGMS-A, etc. If the content is permitted to be recorded, a local rights data, protected to maintain its integrity, is created by rights manager 68 (step 69). In particular, IPRM processes incoming CCI and/or EMI information, determines whether the associated content can be recorded and if recording is permitted, it translates the relevant copy control data into the internal rights data format.

The rights data so created contains a set of access rules associated with the content. The rules stored in the rights data must be checked before a playback of recorded content is allowed.

The information stored in the rights data may be used to set protection technologies on all relevant output interfaces, including DTCP, HDCP, CGMS-A and Macrovision. The rights data is securely bound to the recorded content using the key derivation algorithm described herein below. The IPRM system 20, and in particular rights manager 68, generates a unique content encryption key for each recorded piece of content. This prevents end-users from taking an unauthorized copy of the protected content and the associated rights data to another device. The rights data may be constructed using input from other protection systems associated with the content source, such as CableCard, CA smartcard, CA module, Broadcast Flag, DTCP, analog protection such as CGMS-A, Macrovision, etc.

Encrypted content is decrypted (step 71) using the original protection mechanism, e.g., CableCard, CA, DTCP, etc., and the same is immediately re-encrypted using encryption/decryption engine 76 (step 73) using the protected locally-generated unique content encryption key, such that the content is substantially never available in the absence of protection. More particularly, and as depicted in greater detail in FIGS. 3A and 3B discussed below, the encryption/decryption engine 76 is configured to generate the content encryption key through a chain of encryption steps. The local rights data 84 is then protected against unauthorized modifications and stored in persistent storage (step 75) such as hard drive 70. In this case, the persistent storage may also be, e.g., flash memory, etc. The content itself may also be stored in a protected format 86 in persistent storage (step 77) such as hard drive 70 (or a recordable DVD, flash memory card, etc.).

The ESB system of key management and ESB messages used to securely communicate between two devices in the home are described in more detail in the co-pending US Patent Application entitled "Key Management Protocol and Authentication System for Secure Internet Protocol Rights Management Architecture" incorporated by reference above.

Figure 3A:
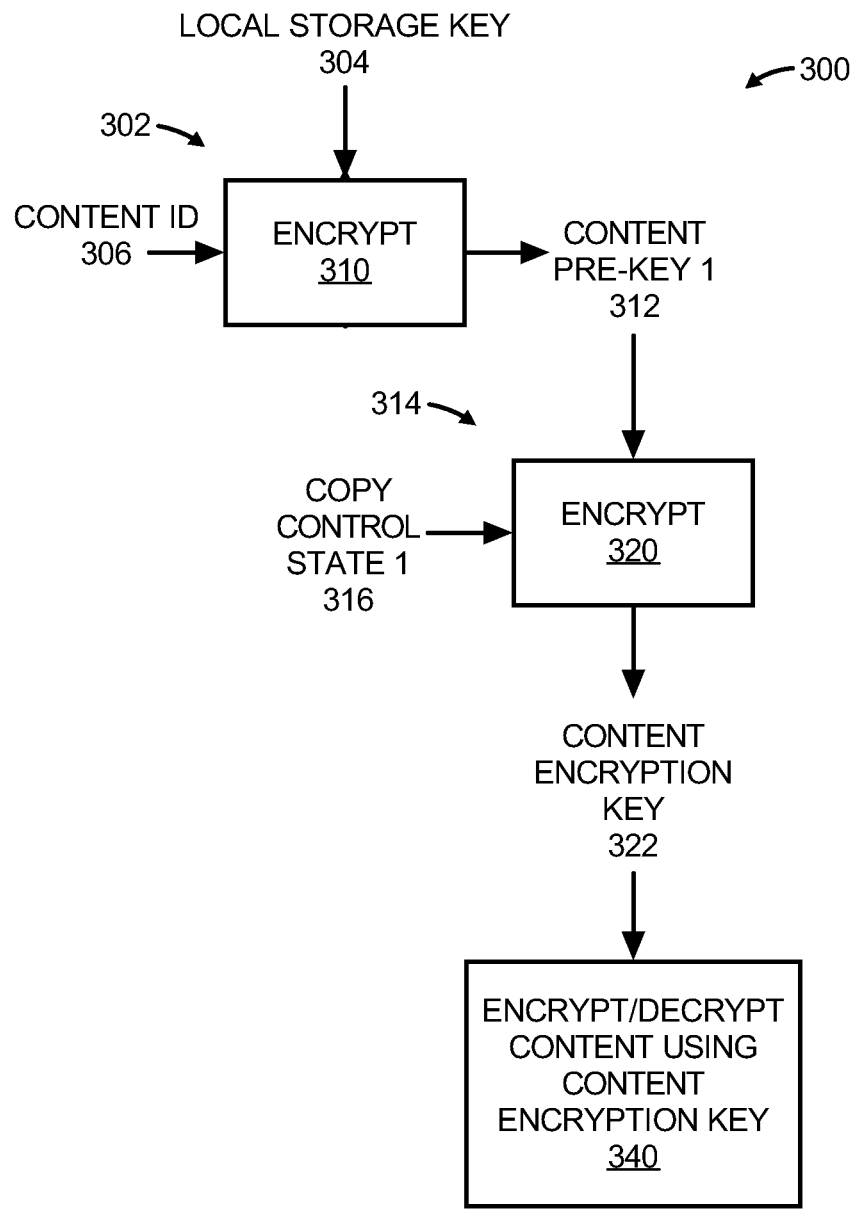
FIGS. 3A and 3B, respectively, depict flow diagrams of methods for encrypting/decrypting the content, according to embodiments of the invention.
Figure 3B:
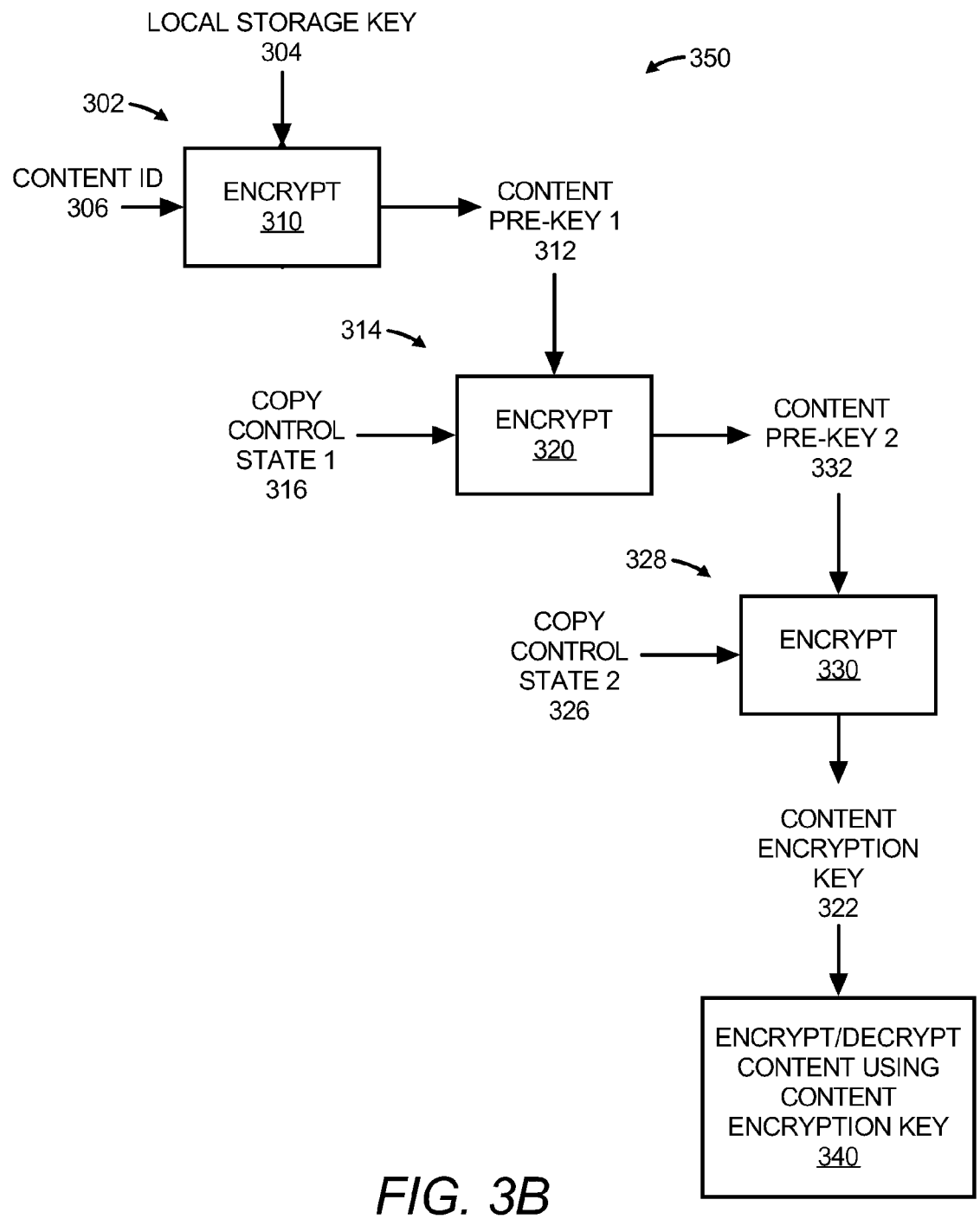

Turning now to FIGS. 3A and 3B, there are shown flow diagrams of methods 300 and 350 for encrypting/decrypting the content, according to embodiments of the invention. The methods 300 and 350 are described with respect to FIGS. 1 and 2 by way of example and not of limitation. It will thus be apparent to one of ordinary skill in the art that the methods 300 and 350 may be performed with systems other than the IPRM system 100 depicted in FIG. 1 and the STB 50 depicted in FIG. 2. In addition, it should be apparent to those of ordinary skill in the art that the methods 300 and 350 represent generalized illustrations and that other steps may be added or existing steps may be removed, modified or rearranged without departing from scopes of the methods 300 and 350.

Generally speaking, and according to one embodiment, the methods 300 and 350 may be considered as being more detailed steps of step 73 in FIG. 2. In this regard, the encryption/decryption engine 76 may be configured to perform the steps contained in either or both of the methods 300 and 350. Thus, the methods 300 and 350 are performed following receipt of the content from, for instance, a CableCard, CA smartcard, a DTCP, etc. According to another embodiment, the methods 300 and 350 may be performed by an encryption/decryption module in the source device or a destination device to create one or more keys to decrypt encrypted content.

Prior to step 302, content may be received, which may be associated with a unique content identification (ID) and copy control bits. At least a portion of the content may be stored, thereby associating the content with one of a first copy control state and a second copy control state, depending on usage.

At step 302, a local storage key 304 that is unique to the DVR 30 is used as a key to encrypt in block 310 a content identification (ID) 306 of the received content to generate a first content pre-key 312. The local storage key 304 that is unique to the DVR 30 may be a secret value called LSS (Local Storage Seed), which may be stored in an obfuscated form or protected by a security chip in the DVR 30. In addition, the encryption algorithm used in block 310 may be any suitable cryptographic algorithm, such as DES, 3DES, AES, etc. The content ID 306 may comprise, for instance, a substantially unique value assigned to the received content, such as, a hash of the content name, file name (with or without the file path), pointer or a "handle" to the content, etc.

At step 314, the first content pre-key 312 is used as a key to encrypt in block 320 a first copy control state 316 of the content to generate a content encryption key 322. The encryption algorithm used in blocks 320 may be any suitable cryptographic algorithm, such as DES, 3DES, AES, etc. In addition, the first copy control state 316 may include a first CCI value for the content, which may be received with the content. According to an embodiment, the CCI value, such as, the restrictions on what a user may do with the content, may be received from the CableCard, for instance. The restrictions may include, for instance, "Copy No More", "Copy Once", etc. The first copy control state 316 may include other DRM rules (e.g., number of playbacks) and content attributes (e.g., time of recording, content expiration, recording type: permanent vs. temporary, etc.).

At step 340, the content is encrypted using the content encryption key 322. Step 340 is discussed in greater detail herein below with respect to the method 350 in FIG. 3B.

With reference now to FIG. 3B, the method 350 depicted therein includes all of the steps discussed with respect to the method 300 in FIG. 3A. However, in FIG. 3B, at step 314, the first content pre-key 312 is used to encrypt at block 320 the first copy control state 316 to derive a second content pre-key 332 instead of the content encryption key 322. The method 350 also includes an additional step 328 of using the second content pre-key 332 as a key to encrypt in block 330 a second copy control state 326 of the content to generate the content encryption key 322. The encryption algorithm used in block 330 may be any suitable cryptographic algorithm, such as DES, 3DES, AES, etc. In addition, the second copy control state 326 is similar to the first copy control state, but is more restrictive that the first copy control state 316. Thus, for instance, the first copy control state 316 may comprise a copy control state that causes the content to have a "Copy Once" state and the second copy control state 326 may comprise a copy control state that causes the content to have a "Copy No More" state.

According to an example, the second content pre-key 332 may be generated so that IPRM may distribute the correct CCI requirements to clients as the content is consumed to substantially ensure that the clients behave appropriately. More particularly, for instance, the second content pre-key 332 may be associated with the "Copy No More" state and IPRM may distribute the second content pre-key 332 to clients so that they may be able to view the content, but may not be able to copy the content.

Step 328 to generate the second content pre-key 332 substantially avoids issues that arise when content associated with the "Copy Once" content is stored in a pause buffer and sent out the 1394 path, for instance. By way of example, if a consumer is receiving "Copy Once" content and storing the encrypted content in a pause buffer, and the consumer later decides while playing the content that he wishes to save the content as a stored program for later viewing, the content played back the next day may be indicated as a "Copy No More" in some usage models and as a "Copy Once" in other usage models. Because IPRM generates content pre-keys 312 and 332 for both of these states, IPRM may distribute the correct content pre-key 312 or 332 depending upon the pertinent usage model and consumer behavior.

At step 340, the content is encrypted using the content encryption key 322. The content may be encrypted using any suitable encryption process using the content encryption key 322 (e.g., 3DES, AES, etc.). In addition, the encrypted content (protected content 86) may be stored in the hard drive 70 of the STB 50. Moreover, the content pre-key 312 may be stored as protected rights data 84 in the hard drive 70. Alternatively, neither the first content pre-key 312 nor the second content pre-key 332 is stored at all, but rather, are regenerated using steps 302 and 314 in the method 300 described above. Regeneration of the first content pre-key 312 and the second content pre-key 332 prevents an attacker from stealing the pre-keys 312 and 332 since they are not stored anywhere. Instead, only the content ID 306 and the copy control states 316 and 326 need be stored. In addition, the content ID 306 and the copy control states 316 and 326 do not have to be stored in a protected manner since any modification to either of this information will result in an incorrect derivation of the first content pre-key 312, the second content pre-key 332 and/or the content encryption key 322, which prevents the recorded content from being decrypted correctly.

As discussed above, the second content pre-key 332 may be optional, for instance, when the first copy control state 316 is a "Copy No More" copy state. In this regard, the methods 300 or 350 may be performed when there are more than one copy control state available during recording and the method 300 may be performed when there is only one copy control state available. More specifically, content is typically received with only one set of CCI values (e.g., "copy once"), which a receiving recording device must convert to the appropriate copy control state based on the user action and usage model. When the content is played "live" without recording or when it is recorded temporarily in the pause buffer, the copy control state may retain the value of "copy-once", while content recorded permanently must reflect "copy no more" copy control state. Since the user's intention is not always known at the beginning of the recording, the receiving device may need to store and use both copy control states in the key derivation method 350. Subsequently, when the content is played back (locally or remotely) later, when it is known whether the recording was permanent or temporary, the correct copy control state will be used to set output protection as well as signaling the correct copy control state and content pre-key to the receiving device.

Through use of the copy control states 316 and 326 that define one or more restrictions on the copying of the content to generate the content encryption key 322, the content is also encrypted to include the restrictions set forth in the copy control states 316 and 326. In other words, the copy control states 316 and 326 are embedded in the encryption of the content.

In addition, when the encrypted content is to be played back, the appropriate method 300 or 350 may be implemented to derive the content encryption key 322 at step 314 or step 328 from one of the first and second content pre-keys 312 and 332. More particularly, either the device that encrypted the content or a destination device that receives the encrypted content may perform the appropriate method 300 or 350 to derive one or more of the content pre-keys 312. In addition, at step 340, the encrypted content is decrypted using the derived encryption key 322.

The methods 300 and 350 generally enable IPRM to distribute the first and/or second content pre-keys 312, 332 and copy control state 316 and/or 326 in its ES Broker protocol to other clients of, for instance, the home network. In addition, the copy control state data may be distributed in unencrypted form, as any modification to the copy control state data would corrupt the generated content encryption key 322.

Furthermore, although the method 350 has been depicted as including two copy control states 316 and 326, it should be understood that additional encryption steps using additional copy control states and content pre-keys may be included in the method 350 without departing from a scope thereof.

Figure 4:
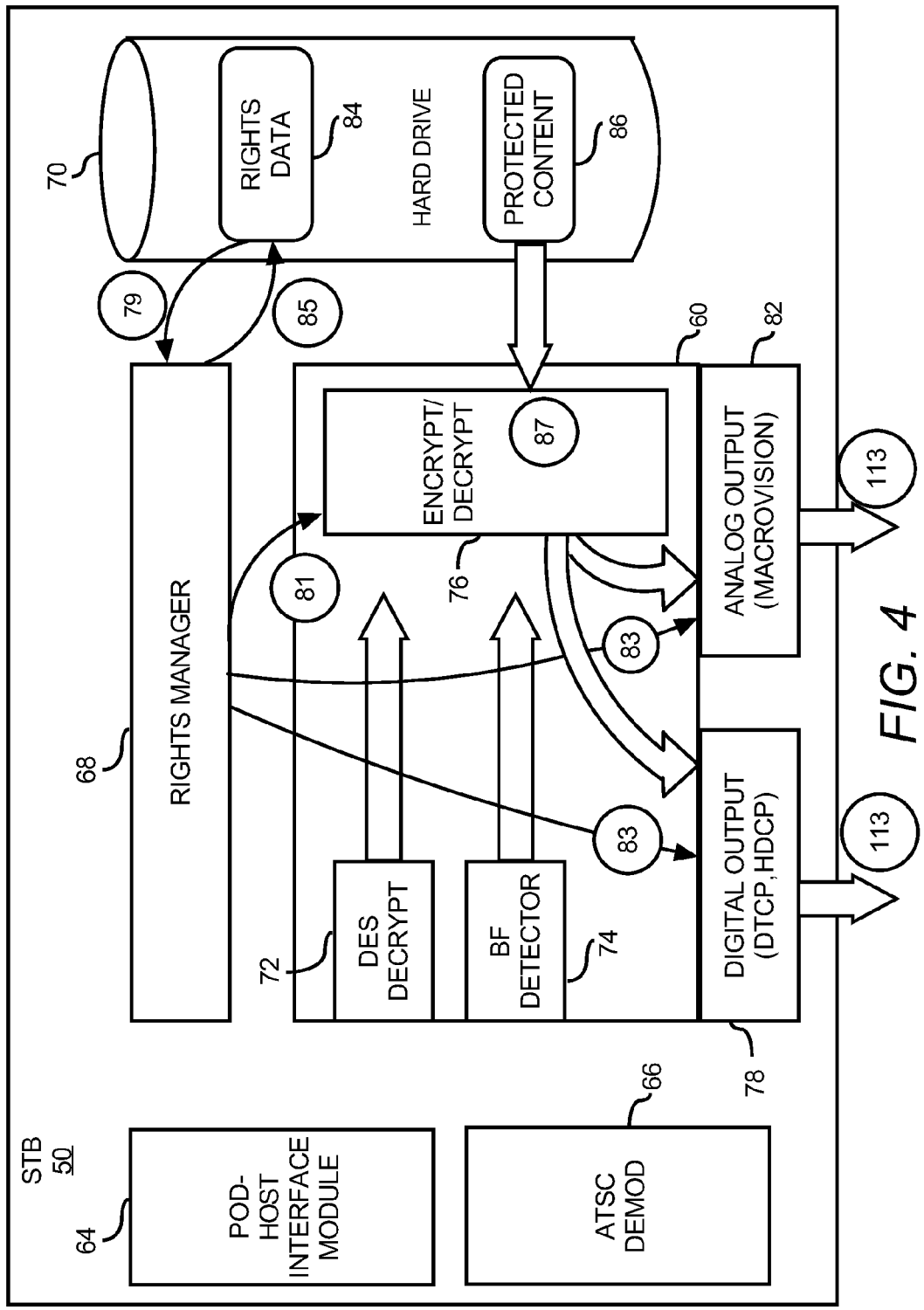
FIG. 4 depicts an example of a system illustrating a method of secure local playback, according an embodiment of the invention.

With reference now to FIG. 4, there is shown an example of a system that illustrates a method of secure local playback of protected content 86, according to an embodiment of the invention. It should be apparent to those of ordinary skill in the art that the method depicted in FIG. 4 represents a generalized illustration and that other steps may be added or existing steps may be removed, modified or rearranged without departing from a scope of the method depicted in FIG. 4.

Before stored protected content 86 is played back, the associated rights data 84 (e.g., copy control state) is optionally checked for integrity with the rights manager 68 (step 79). All applicable content access rules stored in the rights data 84 are enforced for this content, e.g., viewing window, number of playbacks to an external interface, type of playbacks to an external interface, video resolution of output, e.g., constrained image, time windows, size of pause buffer, etc. If the rights data 84 permits the consumption of the content 86, the content decryption key is generated using steps 302, 314 and, optionally, 328, and used by the encryption/decryption engine 76 (step 81) to decrypt the content.

If the content is consumed on an external device, e.g., a digital TV, the corresponding digital output 78 or analog output 82 is configured (step 83) to protect the content according to the copy-protection information stored in the rights data 84. This copy protection information may be exported to DTCP, HDCP, Macrovision or some other copy protection system and may include CCI, APS, constrained image, etc. This may include updating the rights data 84 (step 85), e.g., to decrement a playback count. According to an embodiment, IPRM may issue the second content pre-key 332 when the content is exported to another device.

After these steps are performed, the content may be read off the disk, decrypted and optionally decoded (step 87), and output for consumption (step 113). Pursuant to the configuration step above, if the content is output on a secure interface, the content may be protected using the corresponding copy protection technology, e.g. DTCP, HDCP, CGMS-A, Macrovision, etc. Similarly, for content output to a digital removable medium, e.g., a DVD-RW, a corresponding protection technology such as VCPS or CPRM or CSS may be employed. Certain additional details of the implementation of such copy protection schemes are provided in the co-pending U.S. patent application Ser. No. 10/933,011.

A secure content transfer within the home network is detailed below in connection with FIG. 5. In general, when two end-points want to securely stream, copy or move content between them, a secure session is established which includes a set of symmetric keys that both end-points share and use to encrypt, decrypt and optionally authenticate individual packets. This portion of the IPRM system may employ symmetric cryptography, so that latency and server loading are minimized during session set-up. The secure session is used to communicate control and rights information, as well as key exchange. Content is transmitted over a separate channel secured by encryption for persistent content.

Figure 5:
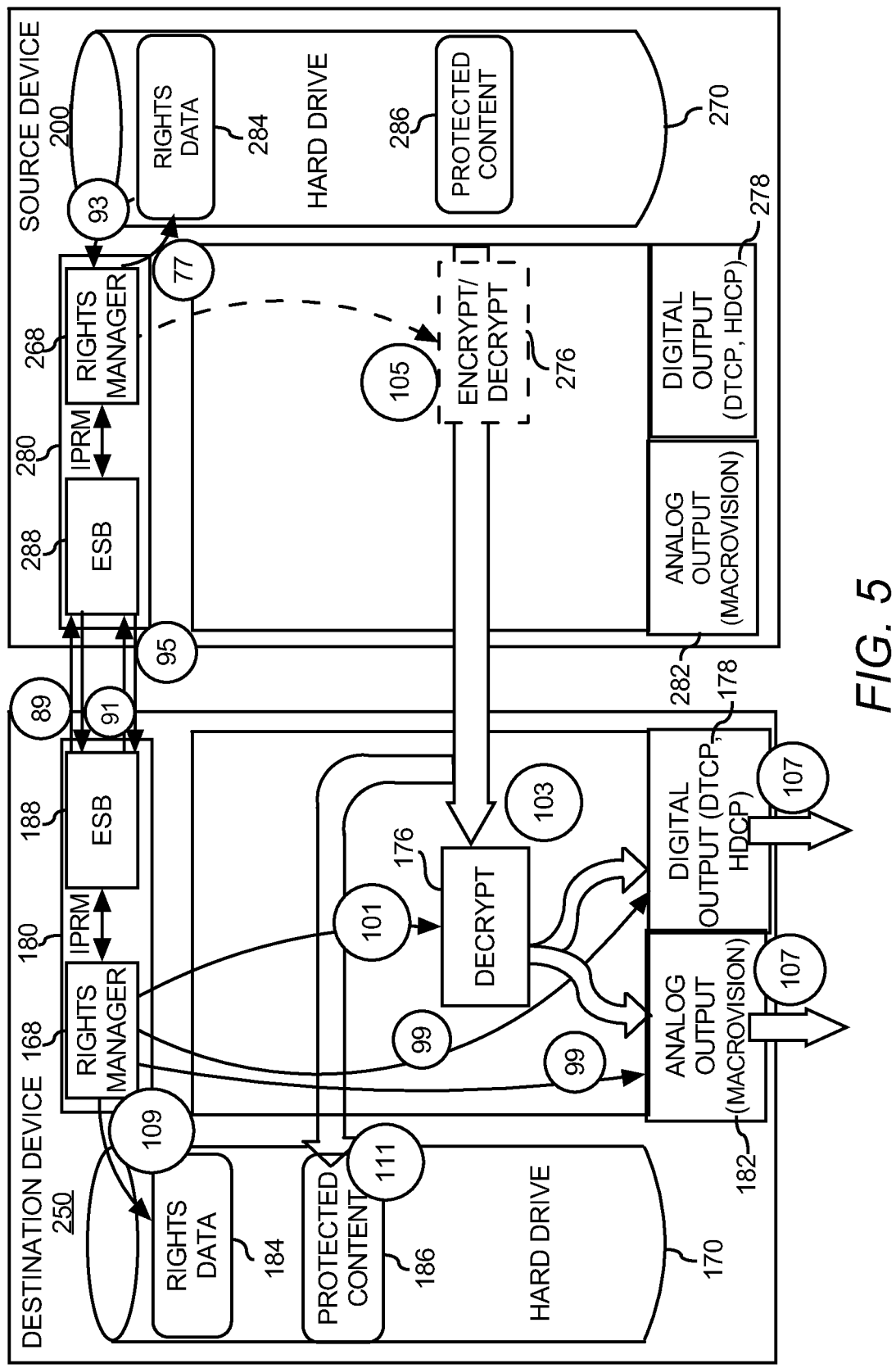
FIG. 5 depicts an example of a system illustrating a secure playback of protected content across a home network, according to an embodiment of the invention.

In more detail, and referring to FIG. 5, a source device 200, which may be an STB/DVR, is shown having a hard drive 270 storing protected rights data 284 and protected content 286. An IPRM system 280 is employed having a rights manager 268 and a module 288, which implements the Electronic Security Broker ("ESB") protocol, which is described in greater detail in the co-pending patent applications referenced elsewhere in the specification. In the same way, a destination device 250, which may be an STB/DVR, is shown having a hard drive 170 storing protected rights data 184 and protected content 186. An encryption/decryption module 176 is employed for the same reason as that described above, as is analog output 182 and digital output 178. An IPRM system 180 is employed having a rights manager 168 and an ESB module 188.

First, before content 286 can be streamed or copied to another authorized device, the source device 200 and the destination device 250 must authenticate each other (step 89). This authentication and further key exchange may be performed in a number of ways and is discussed in greater detail below.

To transfer content, a destination device 250 requests the playback, copy or move of a specified piece of content 286 having rights data 284 stored on source device 200 (step 91). The destination device 250 may further specify a use for the licensed content, e.g., a specified number of playbacks, etc. The source device 200 retrieves information about the rights data 284 from the rights manager 268 within IPRM system 280 (step 93). The source device 200 checks the rights data for integrity and verifies that the requested rights can be granted, e.g., that the rights data has not expired, that the playback count has not been exhausted, that the copy protection has not been violated, etc. Assuming the rights can be granted, then the first content pre-key 316 and, optionally, the second content pre-key 332, are extracted or regenerated from the rights data and together with the copy control state and optionally with the requested rights is securely communicated back to the destination device 250 (step 95). In some cases, the original rights data 284 may be updated accordingly by the rights manager 268 (step 77) (e.g., decrement a play count or a copy count). More specifically, the source device 200 determines which set of copy control states to deliver to the destination device 250. If further copying is allowed, the source device 200 will deliver the first pre-key 312 and the less restrictive copy control state 316. The destination device 250 may use the copy control state 316 to set the copy protection on its outputs, may derive the more restrictive second copy control state 326, and may use both copy control states 316 and 326 and the first content pre-key 312 to derive the content encryption key 322 using steps 314 and 328, respectively, depicted in FIG. 3B. The destination device 250 may determine the second copy control state 326 by using the less restrictive copy control state 316 (e.g. "copy once") and decrementing it to derive the next more restrictive state (e.g. "copy no more"). The source device 200 may indicate to the destination device 250 that a second copy control state 326 must be derived or the destination device 250 may determine that itself by detecting that the copy control state 316 is the less restrictive one. Alternatively, the source device 200 may send both the less restrictive copy control state 316 and the more restrictive copy control state 326 together with the first pre-key 312.

In addition, the destination device 250 will use the content encryption key 322 to decrypt the content for playback in block 176. The source device 200 may indicate to the destination device 250 whether to use one or both of the encryption steps (328 only, or both 314 and 328) to derive the content encryption key 322 and which copy control state (316 or 326) to use to set output protection.

If further copying is not allowed, the source device 200 will deliver the second pre-key 332 and the more restrictive second copy control state 326. The destination device 250 will use the second copy control state 326 to set the copy protection on its outputs and will use the copy control state 326 and the second content pre-key 332 to derive the content encryption key 322 using step 328. The destination device 250 will also use the content encryption key 322 to decrypt the content for playback in block 176.

If the original content was encrypted using only the first copy control state 316 (as described in method 300), the source device 200 may deliver the first content pre-key 312 and the first copy control state 316. The destination device 250 may use the first copy control state 316 to set the copy protection on its outputs and may use the copy control state 316 and the first content pre-key 312 to derive the content encryption key 322, as indicated at step 314. The destination device 250 may also use the content encryption key 322 to decrypt the content for playback in block 176.

If the content is intended to be output on an approved protected interface, such as analog output 182 or digital output 178, then the corresponding parameters, e.g., CCI bits based on copy control state 316 or 326, are communicated to that interface module for subsequent content protection (step 99). Once the destination device 250 generates the decryption keys, it configures the decryption engine 176 (step 101). At this point the content transfer process may commence (step 103).

Decrypted content may then be optionally decoded and output to an allowed interface, such as analog output 182 or digital output 178 (step 107). If the content is going to be recorded on the destination device 250, a corresponding rights data 184 with the acquired rights and a decryption key is created, in a manner that is the same as that described in connection with FIGS. 2-4 (step 109). The content may then be stored in its encrypted form on hard drive 170 as protected content 186 associated with protected rights data 184 (step 111). Optionally, a local re-encryption may be performed (similar to the initial recording scenario), in which case the new encryption key is generated on the destination device 250 as described in FIGS. 3A and 3B. The content may be played back as described in connection with FIG. 4.

The IPRM system disclosed may afford one or more advantages, such as the following. Content obtained over multiple types of interfaces not necessarily protected with IPRM may be securely captured and saved for future local playbacks under protection of IPRM Digital Rights Management without a requirement for additional communication with the infrastructure. Each content is encrypted using a content encryption key that is unique to that particular content and particular device, which binds the associated content usage rules listed in the content rights data only to that specific content and device.

Some or all of the operations set forth in the figures may be contained as a utility, program, or subprogram, in any desired non-transitory computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a non-transitory computer readable storage medium, which include storage devices.

Exemplary non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
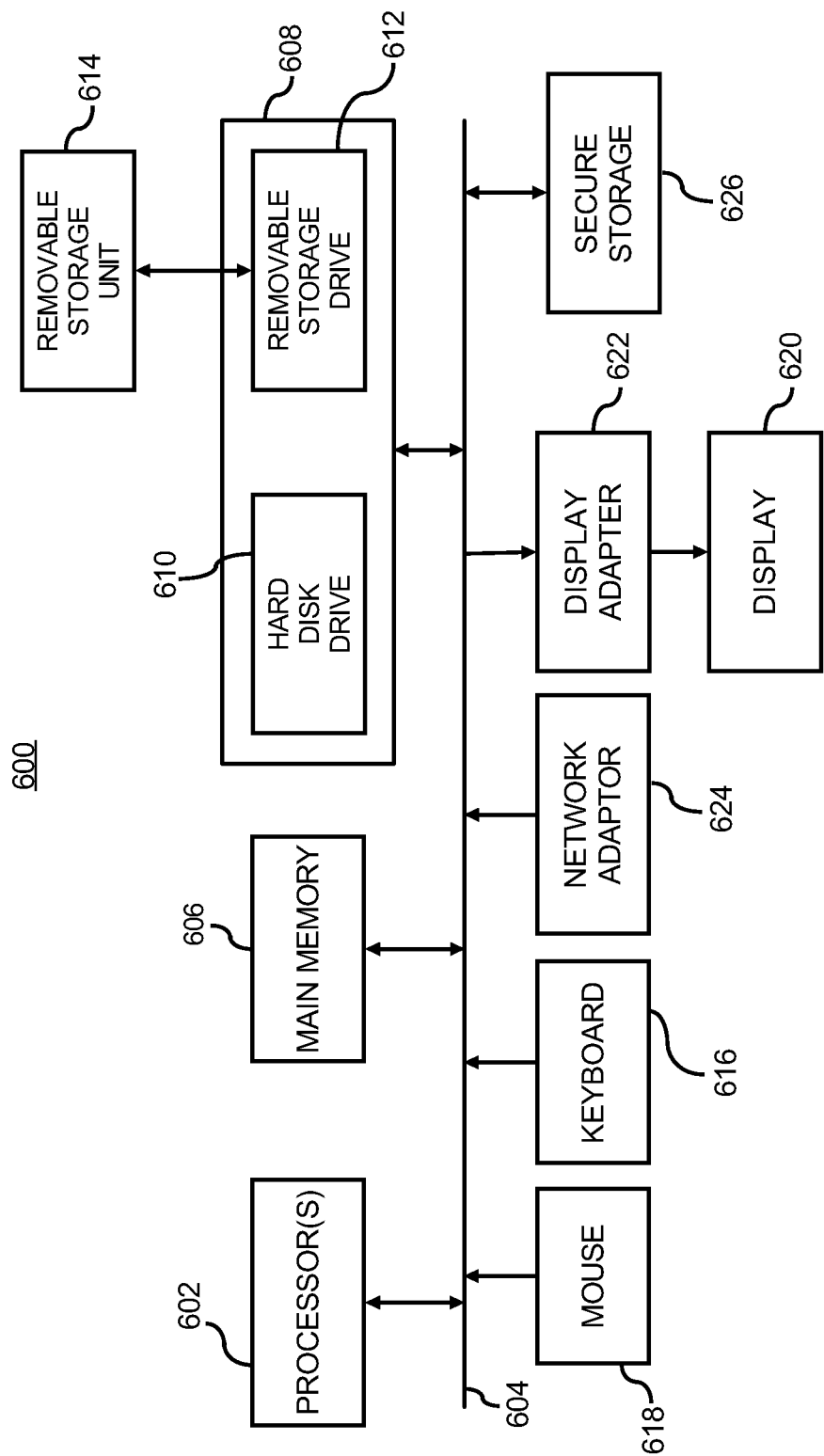
FIG. 6 shows a block diagram of a computing apparatus configured to implement or execute one or more of the processes depicted in FIGS. 2-5.

FIG. 6 illustrates a block diagram of a computing apparatus 600 configured to implement or execute one or more of the processes depicted in FIGS. 2-5, according to an embodiment. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in one or more of the processes depicted in FIGS. 2-5. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for one or more of the processes depicted in FIGS. 2-5 may be stored. A secure storage 626 may be used to protect the local storage key 304 or the local storage seed.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

It will be apparent to one of ordinary skill in the art that other known electronic components may be added or substituted in the computing apparatus 600. It should also be apparent that one or more of the components depicted in FIG. 6 may be optional (for instance, user input devices, secondary memory, etc.).

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method for encrypting content, said method comprising steps performed by a computing apparatus of:

receiving the content in a device, said content being associated with a unique content identification (ID) and copy control bits;
storing at least a portion of the content, thereby associating the content with one of a first copy control state and a second copy control state;
creating a first content pre-key using a local storage key unique to the device as a key to encrypt the content ID of the content
creating at least one of a second content pre-key using the first content pre-key as a key to encrypt the first copy control state and a third content key using the second content pre-key as a key to encrypt the second copy control state;
encrypting the content using one of the second content pre-key and the third content key:
determining a usage model of the content; and
issuing one of the first content pre-key and the second content pre-key based upon the determined usage model.

2. The method according to claim 1, said method further comprising steps performed by a computing apparatus of:
creating both the second content pre-key and the third content key.

3. The method according to claim 1, wherein the content is encrypted by a conditional access module, said method further comprising a step performed by a computing apparatus of:
receiving transmitted copy control bits from the conditional access module.

4. The method according to claim 1, said method further comprising steps performed by a computing apparatus of:
using one of the first copy control state and the second copy control state to set copy protection on outputs of the content based upon the determined usage model.

5. The method according to claim 1, said method further comprising steps performed by a computing apparatus of:
decrypting an encrypted content by:
creating the first content pre-key using a local storage key unique to the device as a key to encrypt the content identification (ID) of the content;
creating at least one of the second content pre-key using the first content pre-key as a key to encrypt the first copy control state and a third content key using the second content pre-key as a key to encrypt the second copy control state; and
decrypting the content using one of the second content pre-key and the third content key.

6. The method according to claim 1, wherein the first copy control state is less restrictive than the second copy control state.

7. The method according to claim 1, wherein the local storage key comprises a value that is one of stored in an obfuscated form and protected by a security chip in the device.

8. A method for encrypting content, said method comprising steps performed by a computing apparatus of:
receiving the content in a device, said content being associated with a unique content identification (ID) and copy control bits;
storing at least a portion of the content, thereby associating the content with one of a first copy control state and a second copy control state;
creating a first content pre-key using a local storage key unique to the device as a key to encrypt the content ID of the content creating at least one of a second content pre-key using the first content pre-key as a key to encrypt the first copy control state and a third content key using the second content pre-key as a key to encrypt the second copy control state;
determining whether rights associated with the encrypted content are grantable to a destination device;
securely communicating one of the first content pre-key and the first copy control state, and the second content pre-key and the second copy control state, to the destination device; and
encrypting the content using one of the second content pre-key and the third content key.

9. The method according to claim 8, further comprising steps performed by the destination device of:
receiving the first content pre-key and the first copy control state;
using the received first copy control state to set copy protection on outputs of the content;
creating the second content pre-key using the first content pre-key as a key to encrypt the first copy control state; and
decrypting the encrypted content using the second content pre-key.

10. The method according to claim 8, further comprising steps performed by the destination device of:
receiving the first content pre-key and the first copy control state;
using the received first copy control state to set copy protection on outputs of the content;
creating the second content pre-key using the first content pre-key as a key to encrypt the first copy control state;
deriving the second copy control state from the first copy control state;
creating a content encryption key using the second content pre-key as a key to encrypt the second copy control state; and
decrypting the encrypted content using the content encryption key.

11. The method according to claim 8, further comprising steps performed by the destination device of:
receiving the second content pre-key and the second copy control state;
using the received second copy control state to set copy protection on outputs of the content;
creating a content encryption key using the second content pre-key as a key to encrypt the second copy control state; and
decrypting the encrypted content using the content encryption key.

12. A device configured to enforce digital rights management rules for content, said device comprising:
a tuner for receiving the content, said content being associated with a content identification (ID) and copy control bits;
storage means for storing at least a portion of the content, thereby associating the content with one of a first copy control state and a second copy control state;
an encryption module configured to create a first content pre-key using a local storage key unique to the device as a key to encrypt the content ID of the content and at least one of a second content pre-key using the first content pre-key as a key to encrypt the first copy control state and a third content key using the second content pre-key as a key to encrypt the second copy control state, and to encrypt the content using one of the second content pre-key and the third content key; and a rights manager configured to determine a usage model of the content and to at least one of use one of the first copy control state and the second copy control state to set copy protection on outputs of the content based upon the determined usage model, and issue one of the first content pre-key and the second content pre-key based upon the determined usage model.

13. The device according to claim 12, wherein the tuner is configured to receive encrypted content, said device further comprising:
a conditional access module configured to decrypt the encrypted content, wherein the encryption module is configured to receive copy control bits from the conditional access module.

14. The device according to claim 12, wherein the encryption module is further configured to determine whether rights associated with the encrypted content are grantable to a destination device and to securely communicate one of the first content pre-key and the first copy control state, and the second content pre-key and the second copy control state, to the destination device.

15. The device according to claim 12, wherein the encryption module is configured to decrypt an encrypted content through a re-creation of the first content pre-key, and at least one of the second content pre-key and the third content key.

16. The device according to claim 12, wherein the local storage key comprises a value that is one of stored in an obfuscated form and protected by a security chip in the device.

17. A non-transitory computer readable storage medium on which is embedded one or more computer programs, said one or more computer programs implementing a method for encrypting content, said one or more computer programs comprising a set of instructions for:
receiving the content in a device, said content being associated with a unique content identification (ID) and copy control bits;
storing at least a portion of the content, thereby associating the content with one of a first copy control state and a second copy control state;
creating a first content pre-key using a local storage key unique to the device as a key to encrypt the content ID of the content
creating at least one of a second content pre-key using the first content pre-key as a key to encrypt the first copy control state and a third content key using the second content pre-key as a key to encrypt the second copy control state;
determining whether rights associated with the encrypted content are grantable to a destination device; and
securely communicating one of the first content pre-key and the first copy control state, and the second content pre-key and the second copy control state, to the destination device;
encrypting the content using one of the second content pre-key and the third content key.

* * * * *